United States Patent
Cuthbertson

(10) Patent No.: US 10,824,186 B2
(45) Date of Patent: Nov. 3, 2020

(54) USER INTERFACE DEVICE

(71) Applicant: CMR Surgical Limited, Cambridge, Cambridgeshire (GB)

(72) Inventor: Rebecca Anne Cuthbertson, Cambridge (GB)

(73) Assignee: CMR SURGICAL LIMITED, Cambridge Cambridgeshire (GB)

( * ) Notice: Subject to any disclaimer, the term of this patent is extended or adjusted under 35 U.S.C. 154(b) by 0 days.

(21) Appl. No.: 16/334,873

(22) PCT Filed: Sep. 19, 2017

(86) PCT No.: PCT/GB2017/052786
§ 371 (c)(1),
(2) Date: Mar. 20, 2019

(87) PCT Pub. No.: WO2018/055352
PCT Pub. Date: Mar. 29, 2018

(65) Prior Publication Data
US 2020/0019205 A1 Jan. 16, 2020

(30) Foreign Application Priority Data
Sep. 21, 2016 (GB) .................................. 1616086.3

(51) Int. Cl.
*G05G 9/047* (2006.01)
*B25J 13/02* (2006.01)
(Continued)

(52) U.S. Cl.
CPC .............. *G05G 9/047* (2013.01); *B25J 13/02* (2013.01); *B25J 13/085* (2013.01); *G05G 1/06* (2013.01);
(Continued)

(58) Field of Classification Search
CPC ........... B25J 13/02; B25J 13/085; G05G 1/06; G05G 2009/04766; G05G 2009/04774; G05G 5/03; G05G 9/047; G05G 9/04788
(Continued)

(56) References Cited

U.S. PATENT DOCUMENTS 2,754,505 A 7/1956 Kenyon
4,795,296 A 1/1989 Jau
(Continued)

FOREIGN PATENT DOCUMENTS

CN 103281983 9/2013

OTHER PUBLICATIONS de Beurs, Marco, International Search Report issued in application No. PCT/GB2017/052786 completion date Dec. 21, 2017, dated Jan. 5, 2018, 2 pages.
(Continued)

*Primary Examiner* — Tony O Davis
(74) *Attorney, Agent, or Firm* — King & Spalding LLP

(57) ABSTRACT

A user interface device for controlling a robot manipulator having an end effector comprising at least one movable element, the user interface device comprising: a body for being held by a user, the body comprising an elongate grip portion configured to be gripped by one or more of a user's second to fourth fingers; a trigger extending transversely to the direction of elongation of the grip portion, the trigger being supported by the body so as to be capable of rotating relative to the body about a rotation axis passing through the grip portion; and a drive mechanism at least partially housed in the grip portion, the drive mechanism being coupled to the trigger for applying a torque to the trigger.

18 Claims, 5 Drawing Sheets

(51) Int. Cl.
  *B25J 13/08* (2006.01)
  *G05G 1/06* (2006.01)
  *G05G 5/03* (2008.04)

(52) U.S. Cl.
  CPC ..... *G05G 5/03* (2013.01); *G05G 2009/04766* (2013.01); *G05G 2009/04774* (2013.01)

(58) Field of Classification Search
  USPC ........................................................ 345/156
  See application file for complete search history.

(56) References Cited

U.S. PATENT DOCUMENTS

| | | | |
|---|---|---|---|
| 5,116,180 A | 5/1992 | Fung et al. | |
| 5,389,865 A * | 2/1995 | Jacobus | B25J 9/1689 318/568.1 |
| 6,256,011 B1 | 7/2001 | Culver | |
| 6,380,923 B1 * | 4/2002 | Fukumoto | G06F 1/163 341/22 |
| 10,434,659 B2 * | 10/2019 | Norton | G06F 3/0219 |
| 10,575,868 B2 * | 3/2020 | Hall | A61B 34/74 |
| 2002/0125325 A1 * | 9/2002 | Plesko | G02B 13/001 235/462.49 |
| 2003/0144649 A1 | 7/2003 | Ghodoussi et al. | |
| 2005/0192727 A1 * | 9/2005 | Shostak | B60C 11/24 701/37 |
| 2006/0025897 A1 * | 2/2006 | Shostak | B60C 23/005 701/1 |
| 2009/0140728 A1 * | 6/2009 | Rollins | G01B 7/023 324/207.16 |
| 2009/0247821 A1 * | 10/2009 | Rogers | A61B 1/00098 600/104 |
| 2010/0045360 A1 * | 2/2010 | Howard | G01D 5/2013 327/365 |
| 2010/0153845 A1 * | 6/2010 | Gregorio | G01H 11/06 715/702 |
| 2010/0228249 A1 * | 9/2010 | Mohr | A61B 1/00009 606/41 |
| 2012/0010749 A1 * | 1/2012 | van der Merwe | A61F 2/54 700/264 |
| 2012/0150349 A1 * | 6/2012 | Rust | B25J 9/1689 700/260 |
| 2012/0185098 A1 * | 7/2012 | Bosscher | B25J 5/005 700/260 |
| 2012/0185099 A1 * | 7/2012 | Bosscher | B25J 9/1689 700/264 |
| 2014/0005668 A1 * | 1/2014 | Rhee | A61B 34/30 606/45 |
| 2014/0005681 A1 * | 1/2014 | Gee | A61F 9/00745 606/130 |
| 2014/0039517 A1 * | 2/2014 | Bowling | B25J 9/161 606/130 |
| 2014/0039681 A1 * | 2/2014 | Bowling | A61B 34/74 700/261 |
| 2014/0114327 A1 * | 4/2014 | Boudreaux | A61B 34/25 606/130 |
| 2014/0114334 A1 * | 4/2014 | Olson | A61B 34/37 606/169 |
| 2015/0035658 A1 * | 2/2015 | Provancher | G05G 5/03 340/407.1 |
| 2015/0077094 A1 * | 3/2015 | Baldwin | G01B 7/003 324/207.17 |
| 2015/0127154 A1 * | 5/2015 | Passot | G06N 20/00 700/257 |
| 2015/0127155 A1 * | 5/2015 | Passot | B25J 9/163 700/257 |
| 2015/0290795 A1 * | 10/2015 | Oleynik | G05B 19/42 700/257 |
| 2016/0059412 A1 * | 3/2016 | Oleynik | B25J 9/0018 700/257 |
| 2016/0179243 A1 * | 6/2016 | Schwartz | G06F 3/044 345/174 |
| 2016/0303739 A1 * | 10/2016 | Apkarian | B25J 3/04 |
| 2016/0318187 A1 * | 11/2016 | Tan | B25J 9/1697 |
| 2016/0354932 A1 | 12/2016 | Bosscher et al. | |
| 2017/0007337 A1 * | 1/2017 | Dan | A61B 34/30 |
| 2017/0077735 A1 * | 3/2017 | Leabman | H02J 7/025 |
| 2017/0150975 A1 * | 6/2017 | Bozung | A61B 17/1628 |
| 2017/0182660 A1 * | 6/2017 | Pipitone | G05B 19/427 |
| 2017/0319282 A1 * | 11/2017 | Jarc | A61B 34/37 |
| 2018/0135409 A1 * | 5/2018 | Wilson | G01V 3/30 |
| 2018/0250085 A1 * | 9/2018 | Simi | A61B 34/30 |
| 2018/0267690 A1 * | 9/2018 | Kemp | F16M 11/24 |
| 2018/0296285 A1 * | 10/2018 | Simi | A61B 17/062 |
| 2018/0321748 A1 * | 11/2018 | Rao | G06F 3/016 |
| 2019/0134821 A1 * | 5/2019 | Patrick | B25J 13/084 |
| 2019/0179146 A1 * | 6/2019 | De Nardi | G06F 3/017 |
| 2019/0380802 A1 * | 12/2019 | Savall | G06F 3/0346 |
| 2020/0019205 A1 * | 1/2020 | Cuthbertson | G05G 5/03 |

OTHER PUBLICATIONS

International Search Report issued for International Patent Application No. GB1616086.3 dated Mar. 1, 2017, 4 pages.
Chinese Office Action issued in application No. 201780057639.5, dated Apr. 16, 2020, 12 pages.

* cited by examiner

USER INTERFACE DEVICE

This invention relates to user interface devices for controlling robotic systems such as master-slave manipulators.

A common task for a user interface device is to control the movement of an object in two or three dimensions. The object could be a real object, or a virtual object such as a character in a game or a simulated vehicle. A convenient manifestation for a device like this is a sculpted form which is shaped so as to fit naturally into one or both of a user's hands. Such a device can carry a series of buttons by means of which the user can provide input. Additionally, the device can contain accelerometers allowing the user to provide input by moving the device itself. Devices of this type are common as controllers for games consoles. Examples include the Microsoft Xbox controllers, the Nintendo Wii Remote and Wii Nunchuck, the Sony DualShock PlayStation controllers and the Sony Move controller. FIG. 1 shows schematically an example of such a controller. The controller of FIG. 1 comprises a sculpted casing 1. The side edges 2 of the casing are curved so as to fit naturally into the palms of both of a user's hands at the same time. The lateral portions 3 of the casing extend rearwardly beyond the central portion 4 of the casing. This allows the more ulnar of the user's fingers to extend around the rear portions, helping the user to hold the device securely. The central part 4 of the casing carries a number of input buttons 5 which can be accessed by the thumbs of a user holding the controller in the normal way.

Ergonomic considerations are of great importance in designing controllers of this type. Some preferred characteristics are:

the shape of the controller should be comfortable for users of different hand sizes to hold;
the buttons should be easily reached when a user is holding the device in the intended way;
the shape of the device should indicate intuitively to a user how the device is to be held.

It is preferred that these features are particularly optimised for devices of this type because they could be used continuously for long periods of time. A significant factor in the ergonomic design of controllers of this type is that their weight is borne by the hands of the user. This affects the muscle loading in the user's forearms in particular, which influences the shapes that a user will find comfortable and the movements that could cause strain.

FIG. 2 shows a known controller for a master-slave manipulator having an end effector that comprises a pair of movable jaws. The controller has a primary input stem 10. The primary input stem constitutes the distal end of a gimbal system 11 which permits the primary input stem to be moved with three degrees of rotational freedom. The proximal end of the gimbal system is attached to a base by a parallelogram system, part of which is shown at 12, which permits the primary input stem to be moved with three degrees of translational freedom with respect to the base. The primary input stem is provided with two rotatable elements 13, 14 which can be bound by loops 15 to an operator's fingers. The operator can move the primary input stem 10 with six degrees of freedom to command a change in position of the end effector, and can move the elements 13, 14 to command opening or closing of the jaws of the end effector. One difficulty with an input device of this type is that it can be tiring to use if the user's forearms are not supported. A rest can be provided for the user's forearms, but that restricts the working positions the user can adopt.

There is a need for an improved design of input device, for example one that is more comfortable to use than prior designs.

According to the present invention there is provided a user interface device for controlling a robot manipulator having an end effector comprising at least one movable element, the user interface device comprising: a body for being held by a user, the body comprising an elongate grip portion configured to be gripped by one or more of a user's second to fourth fingers; a trigger extending transversely to the direction of elongation of the grip portion, the trigger being supported by the body so as to be capable of rotating relative to the body about a rotation axis passing through the grip portion; and a drive mechanism at least partially housed in the grip portion, the drive mechanism being coupled to the trigger for applying a torque to the trigger.

The body may be configured to be gripped in normal use by a single hand of the user.

The body may comprise a head portion attached to the grip portion. The head portion may be located so as to lie alongside the trigger.

The head portion may define a recess on the side thereof opposite the trigger, the recess being configured for receiving the thumb of a user gripping the grip portion.

The trigger may be located relative to the grip portion for engagement by the first finger of a user gripping the grip portion.

The drive mechanism may comprise a motor. The motor may be arranged for applying force to the trigger. The majority of the volume of the motor may be located within the grip portion. The trigger may be arranged to rotate relative to the body about a rotation axis. The rotation axis may be parallel with and optionally coaxial with the rotation axis of the motor.

The drive mechanism may comprise a gearbox. The majority of the volume of the gearbox may be located within the grip portion.

The drive mechanism may terminate in a drive shaft. The drive shaft may be coincident with the rotation axis of the trigger. The trigger may be carried by the drive shaft. The drive mechanism may be configured for applying a torque to the trigger through the drive shaft.

The grip portion may have an axis of elongation. The grip portion may satisfy one or both of the criteria: (i) a minimum circumference perpendicular to that axis of 40 mm and (ii) a maximum circumference perpendicular to that axis of 160 mm.

The length of the grip portion along the axis of elongation may be greater than 50 mm.

The user interface device may comprise a position sensor for sensing the position of the trigger relative to the body.

The user interface device may comprise a force sensor for sensing force applied between the trigger and the body.

According to a second aspect of the invention there is provided a robotic manipulator system comprising: a user interface device as set out above; a robot manipulator comprising at least one sensor; and a control unit configured to control the drive unit to provide force feedback by means of the trigger to a user of the user interface device in dependence on a signal received from the sensor.

The sensor may be a force sensor configured to detect a force applied to a part of an end effector carried by the robot manipulator.

The end effector may be an end effector of a surgical instrument carried by the robot manipulator.

The control unit may be configured to control the motion of a part of the robot manipulator in dependence on input received from the sensor or one of the sensors of the user interface device.

The control unit may be configured to control the motion of the part of the end effector in dependence on input received from the sensor or one of the sensors of the user interface device.

The present invention will now be described by way of example with reference to the accompanying drawings. In the drawings.

Figure 1:
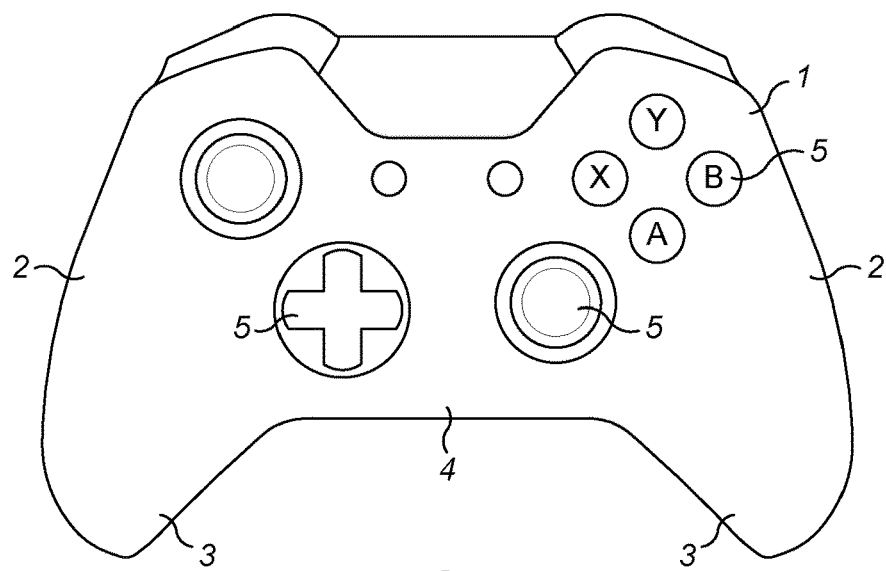
FIG. 1 shows a game controller.
Figure 2:
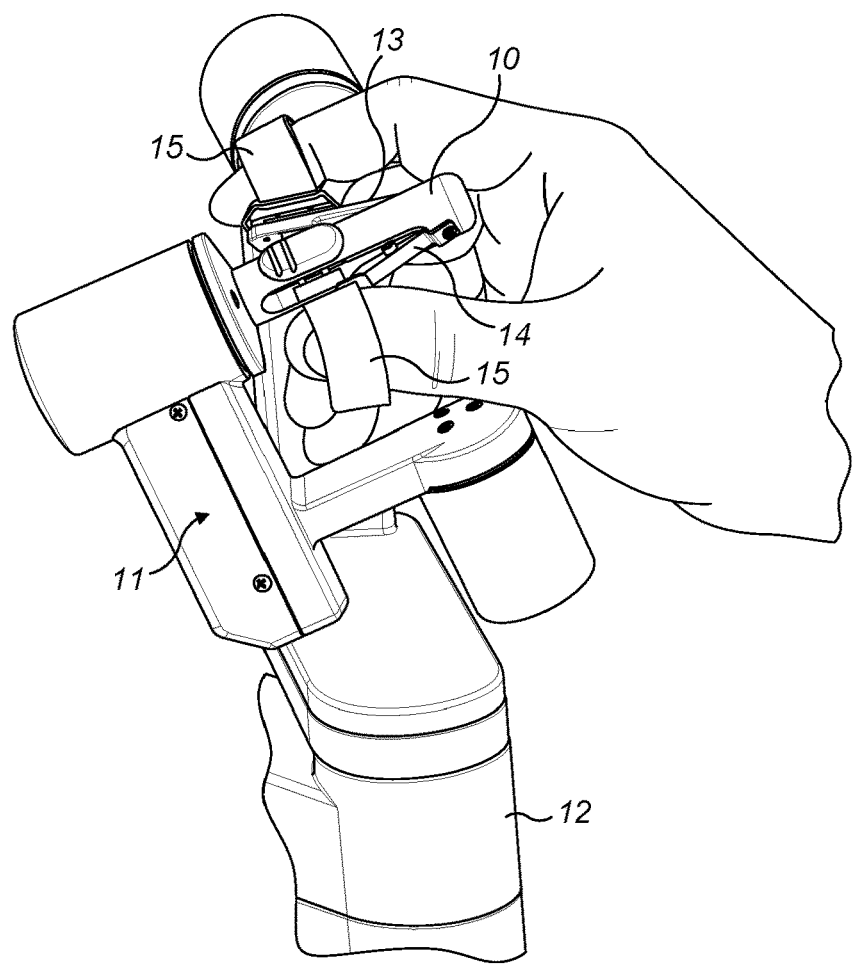
FIG. 2 shows one form of controller for a master-slave manipulator.
Figure 3A:
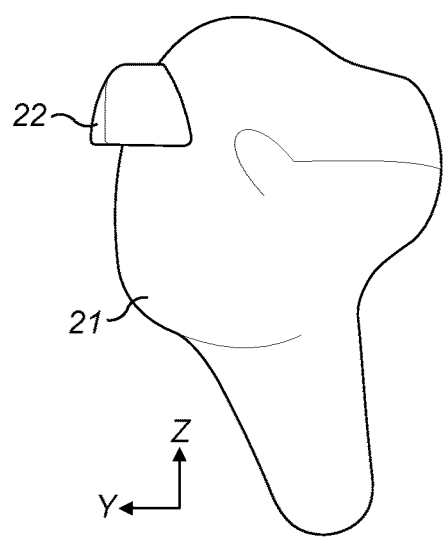
FIG. 3 shows a control device from the front (FIG. 3a), the left side (FIG. 3b), behind (FIG. 3c), the right side (FIG. 3d), above (FIG. 3e) and below (FIG. 3f).
Figure 3B:
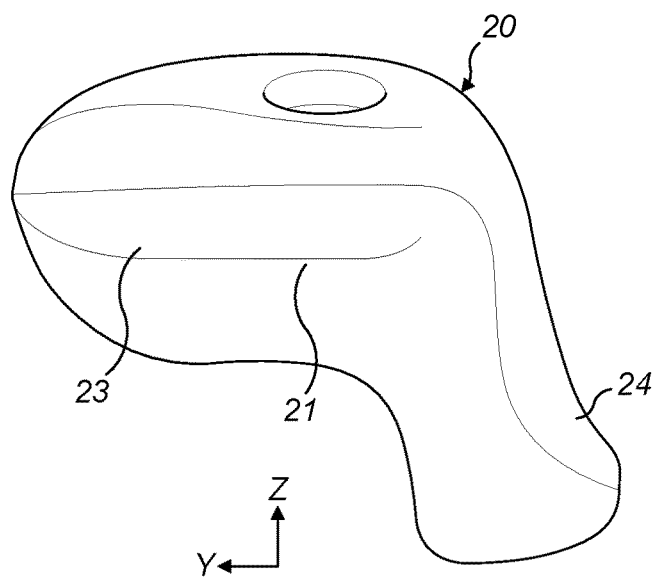
Figure 3C:
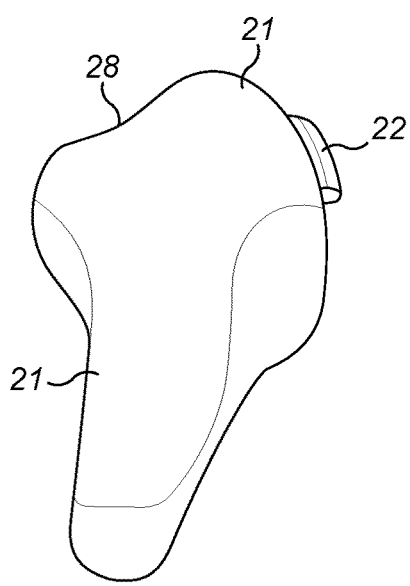
Figure 3D:
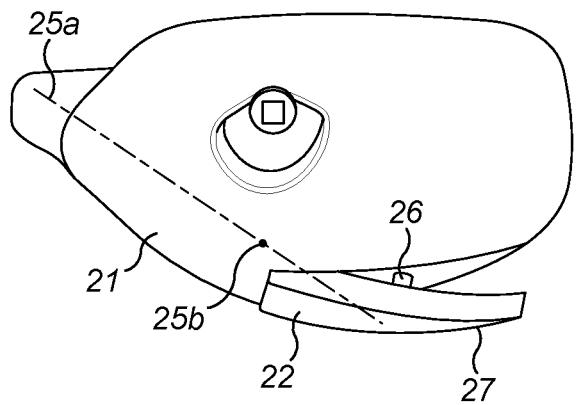
Figure 3E:
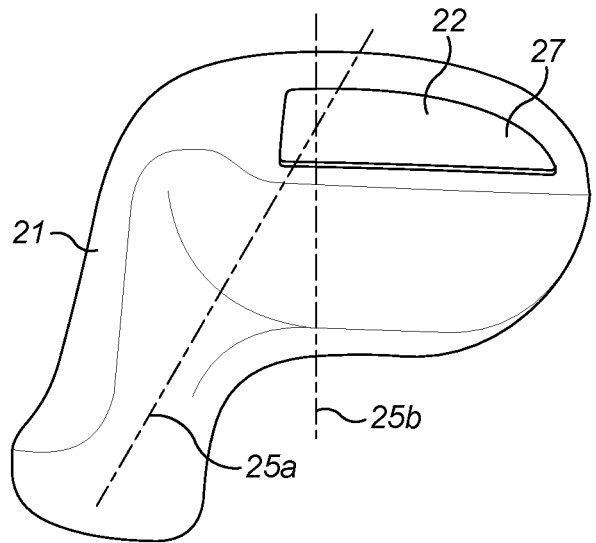
Figure 3F:
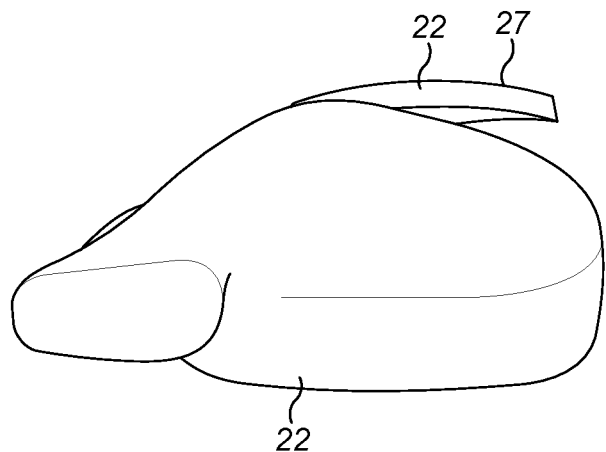
Figure 4:
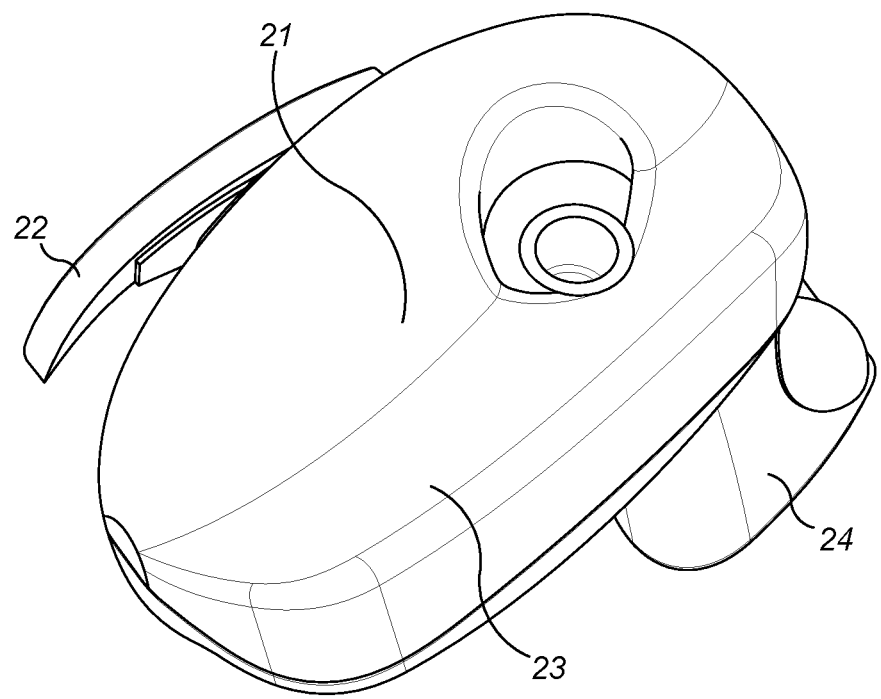
FIG. 4 is an oblique view of the control device of FIG. 3 above, left and in front.

The control device 20 of FIGS. 3 and 4 is designed to be held in a user's hand for providing (i) three-dimensional motion input by translation and rotation of the body 21 of the control device and (ii) functional input in dependence on the position of the trigger lever 22 relative to the body of the control device.

For ease of explanation the controller will be described with reference to mutually orthogonal X, Y and Z axes indicated in figured 3a and 3b. The X axis is the forward/rearward axis of the controller. The Y axis is the left/right axis of the controller. The Z axis is the up/down axis of the controller.

In this example the control device is intended to be grasped in the right hand. A mirror image control device could be intended for the left hand. The body 21 of the control device has a head 23 and a grip 24. The grip 24 sits in the palm of the user's hand. The user's second to fourth fingers are wrapped around the grip. The user's first/index finger is placed on the input lever or trigger 22. The user's thumb is placed on the opposite side of the head to the input lever. User acceptance testing of devices of this type has established that many users naturally pick up and hold such a device in this manner, with their wrist in a neutral position and their thumb opposing their finger. This has the result that for three-dimensional motion input the user's wrist is free to move in flexion, extension, adduction and abduction; and that when the user depresses the input lever 22 towards the body 21 of the control device it is by a pinching action between the user's thumb and index finger, that can help to stabilise the user's hand in relation to the body of the controller when the lever is being positioned.

The grip 24 may be of any convenient shape: for example of generally cylindrical form. It may have a circular, elliptical, square or irregular cross-section. The grip could be configured to be gripped by one, two or three fingers, but it is preferred that it is configured to be gripped by three fingers since that helps the controller to be held firmly and comfortably. It is preferably configured to be gripped by the more ulnar of the user's fingers. Different controllers could be provided for hands of different sizes, but for many users a grip having a circumference of between 80 mm and 180 mm over a length of between 60 mm and 150 mm can be comfortable. The grip could incorporate ribs on its front surface, the ribs defining channels between them to cup the user's fingers when the controller is being held. This can improve comfort and help to stabilise the controller for rotations involving pronation or supination of the user's wrist. The grip is slimmer than the head. In cross-section perpendicular to the extent of the grip, the grip may be generally circular. For example, the shape of the grip may be such that in all cross-sections perpendicular to the length of the grip, the the maximum width of the grip in that cross-section is not more than 30% greater than the depth of the grip in that cross-section.

The head 23 is rigidly attached to the palm grip. The head and the palm grip may be parts of a common housing. The head extends forwardly of the grip. The length of the head in the X direction may, for example be in the range from 50 to 150 mm. This provides sufficient space for a user to align their first finger along the side of the head without the head being overly bulky. Also, if the head is sized in that way, to be of a similar scale to the user's hand, the fact that the head extends in the X direction provides the user with a visual cue to hold their index finger along the side of the head.

Along the right lateral face of the head is the trigger lever 22. The trigger lever is mounted on the head so that it can rotate relative to the head about an axis, e.g. one of axes 25a, 25b (see FIGS. 3d and 3e). In the case of axis 25a, the axis extends generally through the grip portion 24. It extends generally along the elongation direction of the grip portion. In the case of axis 25b the axis 25 is aligned with the Z axis of the controller. The trigger extends forward of the rotation axis 25a/25b. The forward end 27 of the trigger is remote from the rotation axis. The forward end of the trigger can be engaged by the first finger of a user of the controller, when the controller is held as intended, so that the user can press the forward end of the trigger into the head by flexion of the first finger. The length of the trigger is preferably such that the distance between the rotation axis of the trigger and the forward-most outer-facing point of the trigger is in the range from 40 mm to 120 mm. The trigger is resiliently biased away from the central X-Z plane of the head, for example by a leaf or coil spring 26 acting between the head and the trigger. In its resting position the trigger extends out of the profile of the head, as shown in FIG. 3d. A gap is left between the free end of the trigger and the head of the controller when the trigger is in its resting position. Locating the trigger in this way can provide a visual cue for the user to rest their first finger on the trigger when first picking up the controller. The forward end of the trigger may be located in front of the forward end of the head. Alternatively, the forward end of the head may be located in front of the forward end of the trigger Axis 25b has the potential advantage that when the controller is being held as intended by a user, the axis may be substantially parallel to the movement axis of the carpal-metacarpal joint of the first finger of the user's hand on the controller. However, axis 25a has other advantages, as will be discussed further below.

The trigger could be articulated in other ways. For example, it could move linearly: it could be a push-button located near the forward end of the head. Alternatively, it could be a touch-sensitive panel that is attached to the exterior of the head. Instead of extending out of the profile of the head the trigger could remain within the profile of the head, whilst being exposed to the exterior of the head so it can be engaged by a user's finger. Instead of being resiliently biased the trigger could be provided with a finger loop that allows a user to move it under extension of the first finger.

A position sensor is provided within the head to sense the position of the trigger relative to the head. The position sensor could sense position on a binary basis: it could simply discriminate between relatively outward and relatively inward positions of the trigger. More preferably the sensor can discriminate a range of positions of the trigger, allowing it to indicate more precisely the extent to which the trigger is pressed. The position sensor could be a rotational encoder or a potentiometer arranged about the rotation axis of the trigger. In addition to or instead of a position sensor the controller could comprise a force and/or torque sensor for detecting the force applied to the trigger and/or the torque applied to the trigger about axis 25.

When the controller is held as intended the user's thumb extends along the opposite side of the controller to the trigger. This allows the user's thumb to oppose motion of the trigger under the action of the user's index finger. In practice, it is often not necessary for the user to exert force with their thumb to oppose the index finger flexion. However, it has been found that the ability to exert forces on the parts at both sides of the trigger joint can allow users to move the trigger with more precision. It can also help to stabilise the controller in a user's hand. A recess 28 along the upper left side of the head accommodates the user's thumb.

Additional user interface input devices can be provided on the exterior of the head. For example, there could be one or more push-buttons, rotational knobs, joysticks, rocker switches or the like. Conveniently, these can be disposed in the region of the head that is accessible to a user's thumb when their hand is in position on the controller. That is generally the upper left side of the controller in the case of a right-handed controller. One or more input devices could be located on or near the trigger 22, for actuation by the user's first finger. One or more input devices could be located on or near the trigger 22, for actuation by the user's other fingers. If the grip 24 is configured to be gripped by fewer than three fingers then one or more input devices convenient for those fingers could be located on the lower parts of the head. Input devices such as buttons, joysticks and rocker switches may be located on the upper face of the head.

In summary, when a user is correctly holding the controller of FIG. 3 in their right hand:
 i. One or more of their fifth to second fingers wrap around the grip 24. This stabilises the controller relative to the user's hand.
 ii. The user's first finger extends along the right flank of the head of the controller for applying a leftward force against the trigger 22.
 iii. The user's thumb extends along the left flank of the head of the controller. The user's thumb being in this position can help the user to make more precise movements of the trigger. Also, further user interface input devices can be positioned for activation by the user's thumb.

The rear of the head of the controller is continuous with the rear of the grip. The front of the head of the controller extends in front of the most forward part of the grip. The head of the controller is attached to the top of the grip. The head does not extend below the top of the grip. The grip extends downwardly from the head. Other configurations are possible.

Figure 5:
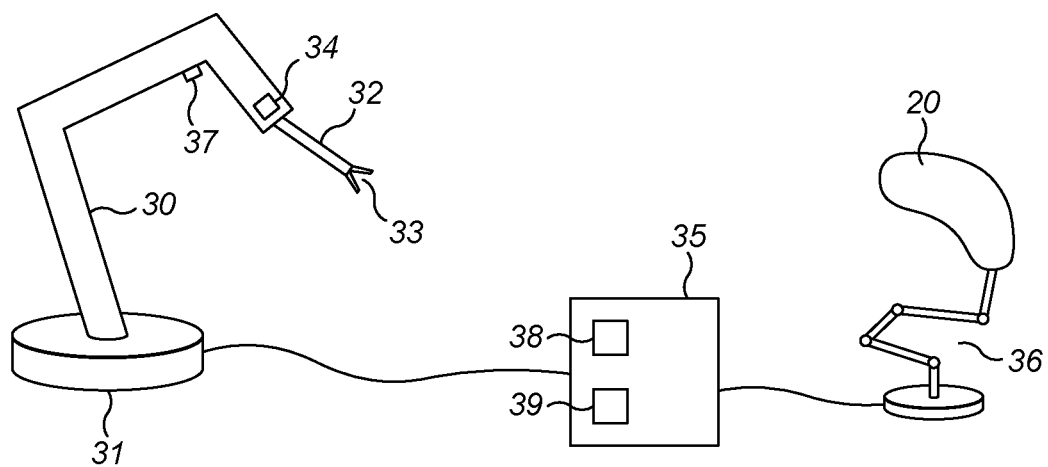
FIG. 5 shows a robotic manipulator system.

The controller of FIG. 3 is intended to be used as an input device for controlling a robot manipulator. The robot manipulator may be as shown in FIG. 5. The robot manipulator of FIG. 5 has an arm 30 which extends from a base 31. The arm is articulated by a series of revolute joints along its length. At the distal end of the arm is an instrument 32 which terminates in an end effector. In this example the end effector has a pair of opposed jaws 33. These can be moved relative to each other to grip or cut objects located between the jaws.

The jaws can be driven to move by a drive motor 34 at the distal end of the arm. The drive motor is coupled to the jaws by cables extending along the interior of the instrument's shaft. The robot is governed by a control unit 35. The control unit receives inputs from the controller 20 of FIG. 3 and from other sources such as motion linkage 36 and arm position/force sensors 37.

Motion linkage 36 is an articulated linkage which supports the controller 20 and permits it to be moved with six degrees of freedom. The configuration of the motion linkage can be detected by sensors on the linkage and passed to the control unit 35. In that way movement of the controller 20 can be used to control the movement of the arm. Instead of the motion linkage 36, the controller 20 could be equipped with accelerometers which permit its position and orientation to be estimated.

The control unit comprises a processor 38 which executes code stored in a non-transient form in a memory 39. On executing the code the processor determines a set of signals for commanding movement of the joints of the robot, and for moving the jaws 33 of the instrument in dependence on the inputs from the controller, the motion linkage and the arm position/force sensors. The code is configured so that the motion of the robot is essentially dictated by the inputs from the controller and the motion linkage. For example, in a normal operating mode (i) the attitude of the end effector may be set by the attitude of the controller about its rotational degrees of freedom; (ii) the position of the end effector may be set by the position of the controller about its translational degrees of freedom; and (iii) the configuration of the jaws may be set by the position of the trigger 22 relative to the body 21.

Figure 6:
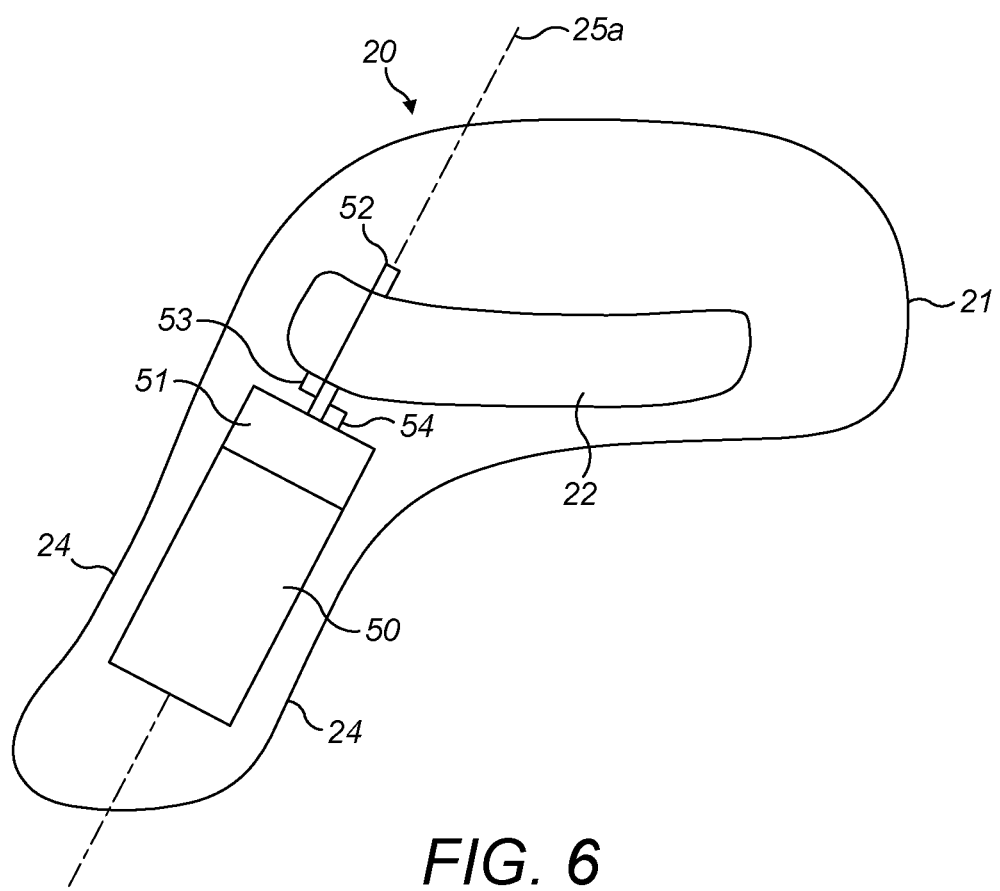
FIG. 6 is a partial cross-section through the controller of FIG. 3.

FIG. 6 shows a partial cross-section through the controller of FIG. 3. In FIG. 6 the body of the controller is sectioned on the X-Z plane and the trigger 22 is shown in full.

In FIG. 6 the rotation axis of the trigger is 25a. Axis 25 runs through the grip portion 24. Inside the grip portion 24 is an electric motor 50 which drives a gearbox 51. The output shaft 52 of the gearbox serves as a pivot for the trigger about axis 25a. The rotation axis of the output shaft 52 is coincident with the rotation axis 25a. The trigger is fixedly attached to the output shaft 52. A torque sensor 53 senses the torque between the trigger and the output shaft. A position sensor 54 senses the position of the output shaft. The outputs of the sensors 53, 54 pass to the control unit 35. The control unit 35 provides a drive signal to the motor 50. The gear ratio of the gearbox may be in the range from 10:1 to 25:1, but other ratios are also possible. The gearbox may be omitted if the motor itself has a suitable rating. The trigger is attached directly to, and carried by, the output shaft of the gearbox or of the motor if the gearbox is omitted. The motor may comprise a rotor and a stator. The motor may have a rotation axis: i.e. the axis about which the rotor rotates with respect to the stator. The rotation axis of the trigger may be parallel with and more preferably coincident with the rotation axis of the motor. That allows for efficient packaging of the motor in the controller, without a need for complex linkages to transfer drive across to the trigger.

The system may operate in various ways to provide a command signal to the drive motor 34 which drives the jaws. In a position authority mode the jaws are driven towards a position that maps on to the position of the trigger 22 relative to the head 21, as sensed by position sensor 54. In a force authority mode the jaws are driven so as to apply a force that maps on to the force applied to the trigger 22 relative to the head 21, as sensed by force sensor 53. Combinations of these modes are also possible.

The motor 50 is used to provide force feedback (which encompasses torque feedback) to a user of the controller. The amount of force feedback to be provided can be determined by the control unit using a predetermined algorithm. For example, the amount of force to be provided may map to the force detected by a force sensor that measures the force acting between the jaws of the end effector. The motor can then be driven with the target of achieving that level of force at the sensor 53.

In order to provide accurate and workable levels of force feedback the motor 50 and the gearbox 51 must be of sufficient size. This presents packaging difficulties to fit the motor and/or the gearbox in the controller without the controller becoming excessively large. By designing the controller so that the axis 25a of the trigger can be aligned with the grip of the controller, the motor and gearbox can conveniently be located within the grip. The motor may be wholly, mostly or partly within the grip. The gearbox may be wholly, mostly or partly within the grip. The output of the gearbox may be coincident with the axis of the trigger. It has been found that this approach has a number of advantages. First, there is no need for an additional gear mechanism to translate or rotate the drive from the motor to act about the axis of the trigger. This reduces weight in the controller and reduces assembly cost. Second, many typical motors and gearboxes suitable for the task are 10 to 40 mm in diameter. These can readily fit in a grip 24 intended to be fully or partially encircled by the user's fingers. Third, the motor and gearbox may comprise much of the weight of the controller. By locating them within the part of the controller that is gripped by the user the loading on the user's wrist and hand to support the controller in a given attitude can be reduced.

The motor and/or the gearbox could be of circular cross-section perpendicular to axis 25a. Axis 25a could be at the centre of that cross-section. Alternatively, the axis 25a, and correspondingly the output shaft of the gearbox, could be offset from the cross-sectional centre of the motor and/or the gearbox.

In order for the trigger to be directly driven about its rotation axis by the output of the motor 50 or the gearbox 51, the rotation axis of the trigger should extend through the grip portion. To illustrate, if the rotation axis of the trigger is positioned as shown at 25b in FIG. 3e it is difficult for it to be driven by directly by a motor in the grip. Preferably the rotation axis of the trigger is substantially parallel with (e.g. within 30°, 20°, 10° or 5° of the principal axis of the grip. This provides flexibility over which motors/gearboxes can be used. The grip may be that portion of the controller that can be partially or fully encircled by any of the second to third fingers of a user when the user's hand is in position on the controller. The grip may be a portion of the controller having a length of at least 70 mm along an axis, and a circumference perpendicular to that axis of between 80 mm and 180 mm at all points along the portion. The grip portion may be designated by grooves and/or ridges for aligning the fingers of a user circumferentially of the grip. The principal axis of the grip may be the axis running centrally through the grip along its longest dimension.

The control unit may be configured to drive the robot 30 in any suitable way in response to movement of the trigger. However, it is preferred that the control unit is configured to, in response to movement of the trigger, cause a movable component of an instrument carried by the robot to move relative to a body of that instrument. The movable component may be or may be part of an end effector. The movable component may be a jaw or cutter. There may be two or more movable opposed jaws or cutters in the end effector. The control unit may be configured to cause both or all of those jaws or cutters to move towards each other in response to actuation of the trigger. The instrument may be a surgical instrument. Instead of moving a movable component in response to the action of the trigger, the control unit could perform another function: for example, activating a light or a camera. The robot may be a surgical robot. Alternatively, the instrument could be an industrial or other form of tool. The robot could be an industrial robot or a robot for another function. The body of the instrument could comprise a coupling for releasable attachment to a robot and an elongate shaft running between the coupling and the end effector.

Where references to a hand of an operator are dependent on the size and range of motion of the hand, the hand may be considered to be of the average size and range of motion for an adult in the United Kingdom.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A user interface device configured to control a robot manipulator having an end effector comprising at least one movable element, the user interface device comprising:
   a body configured to be held by a user, the body comprising an elongate grip portion configured to be gripped by one or more of a user's second to fourth fingers and a head portion attached to the grip portion;
   a trigger external to the head portion, the trigger extending transversely to the direction of elongation of the grip portion and lying alongside an external face of the head portion, the trigger being supported by the head portion so as to be configured to rotate relative to the head portion about a rotation axis passing through the grip portion; and
   a drive mechanism at least partially housed in the grip portion, the drive mechanism being coupled to the trigger in order to apply a torque to the trigger.

2. A user interface device as claimed in claim 1, wherein the body is configured to be gripped in normal use by a single hand of the user.

3. A user interface device as claimed in claim 1, wherein the head portion defines a recess on the side thereof opposite the trigger, the recess being configured to receive the thumb of a user gripping the grip portion.

4. A user interface device as claimed in claim 1, wherein the trigger is located relative to the grip portion for engagement by the first finger of a user gripping the grip portion.

5. A user interface device as claimed in claim 1, wherein the drive mechanism comprises a motor, the majority of the volume of the motor being located within the grip portion.

6. A user interface device as claimed in claim 5, wherein the rotation axis of the trigger is coincident with the rotation axis of the motor.

7. A user interface device as claimed in claim 1, wherein the drive mechanism comprises a gearbox, the majority of the volume of the gearbox being located within the grip portion.

8. A user interface device as claimed in claim 1, wherein the drive mechanism terminates in a drive shaft, the drive shaft being coincident with the rotation axis of the trigger.

9. A user interface device as claimed in claim 8, wherein the trigger is carried by the drive shaft.

10. A user interface device as claimed in claim 8, wherein the length of the grip portion along the axis of elongation is greater than 50 mm.

11. A user interface device as claimed in claim 1, wherein the grip portion has an axis of elongation and satisfies one or both of the criteria: (i) a minimum circumference perpendicular to that axis of 40 mm and (ii) a maximum circumference perpendicular to that axis of 160 mm.

12. A user interface device as claimed in claim 1, comprising a position sensor configured to sense the position of the trigger relative to the body.

13. A user interface device as claimed in claim 1, comprising a force sensor configured to sense force applied between the trigger and the body.

14. A robotic manipulator system comprising:
a user interface device as claimed in claim 1;
a robot manipulator comprising at least one sensor; and
a control unit configured to control the drive unit to provide force feedback by means of the trigger to a user of the user interface device in dependence on a signal received from the sensor.

15. A robotic manipulator system as claimed in claim 14, wherein the sensor is a force sensor configured to detect a force applied to a part of an end effector carried by the robot manipulator.

16. A robotic manipulator as claimed in claim 15, wherein the end effector is an end effector of a surgical instrument carried by the robot manipulator.

17. A robotic manipulator as claimed in claim 14, wherein the user interface device is as claimed in claim 12; and the control unit is configured to control the motion of a part of the robot manipulator in dependence on input received from the sensor or one of the sensors of the user interface device.

18. A robotic manipulator as claimed in claim 17, wherein the control unit is configured to control the motion of the part of the end effector in dependence on input received from the sensor or one of the sensors of the user interface device.

* * * * *